United States Patent
Saruta et al.

(10) Patent No.: US 10,354,130 B2
(45) Date of Patent: Jul. 16, 2019

(54) IMAGE RECOGNITION METHOD, IMAGE RECOGNITION APPARATUS, AND RECORDING MEDIUM

(71) Applicant: CANON KABUSHIKI KAISHA, Tokyo (JP)

(72) Inventors: Takayuki Saruta, Tokyo (JP); Shunta Tate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/222,639

(22) Filed: Jul. 28, 2016

(65) Prior Publication Data

US 2017/0039417 A1  Feb. 9, 2017

(30) Foreign Application Priority Data

Aug. 5, 2015 (JP) .................. 2015-155462

(51) Int. Cl.
*G06K 9/00* (2006.01)
*G06K 9/46* (2006.01)

(52) U.S. Cl.
CPC ..... *G06K 9/00362* (2013.01); *G06K 9/00228* (2013.01); *G06K 2009/4666* (2013.01)

(58) Field of Classification Search
CPC ....... G06K 9/00228; G06K 2009/4666; G06K 9/00362
See application file for complete search history.

(56) References Cited

U.S. PATENT DOCUMENTS

| | | | | |
|---|---|---|---|---|
| 5,905,807 A * | 5/1999 | Kado | ................... | A61B 5/1176 375/E7.083 |
| 8,891,819 B2 * | 11/2014 | Kaneda | ................... | A61B 3/113 345/158 |
| 2006/0050933 A1 * | 3/2006 | Adam | ................ | G06K 9/00221 382/118 |
| 2006/0115156 A1 * | 6/2006 | Nakajima | .......... | G06K 9/00362 382/190 |
| 2007/0201747 A1 * | 8/2007 | Yamada | ............. | G06K 9/00228 382/199 |
| 2008/0068466 A1 * | 3/2008 | Tamaru | ................... | G03B 17/00 348/208.99 |
| 2008/0118156 A1 * | 5/2008 | Okada | ................ | G06K 9/00228 382/195 |
| 2009/0087100 A1 * | 4/2009 | Hu | ...................... | G06K 9/00228 382/190 |

(Continued)

OTHER PUBLICATIONS

Richard Socher, et al.—Parsing Natural Scenes and Natural Language with Recursive Neural Networks; International Conference on Machine Learning 2011.

(Continued)

*Primary Examiner* — Shaghayegh Azima
(74) *Attorney, Agent, or Firm* — Canon U.S.A., Inc. IP Division

(57) ABSTRACT

An image recognition method for an image recognition apparatus includes detecting, setting, acquiring, selecting, and specifying. At least one part of an identification target is selected from an identification target image. An inquiry region is set based on the detected part. A feature amount of the set inquiry region is acquired. At least one instance image corresponding to the identification target image is selected based on the acquired feature amount. A specific region of the identification target from the identification target image is specified based on the selected instance image.

13 Claims, 15 Drawing Sheets

(56) References Cited

U.S. PATENT DOCUMENTS

| | | | | |
|---|---|---|---|---|
| 2010/0014758 A1* | 1/2010 | Yano | ............... | G06K 9/00228 |
| | | | | 382/195 |
| 2010/0014775 A1* | 1/2010 | Ikeda | ............... | G06K 9/00228 |
| | | | | 382/274 |
| 2010/0177929 A1* | 7/2010 | Kurtz | ............... | G06K 9/00228 |
| | | | | 382/103 |
| 2011/0091071 A1* | 4/2011 | Sabe | ............... | G06K 9/00281 |
| | | | | 382/103 |
| 2011/0091116 A1* | 4/2011 | Yano | ............... | G06K 9/4609 |
| | | | | 382/209 |
| 2012/0288148 A1* | 11/2012 | Suzuki | ............... | G06K 9/00281 |
| | | | | 382/103 |
| 2012/0288152 A1 | 11/2012 | Yano | | |
| 2013/0050521 A1* | 2/2013 | Okamoto | ............... | G06K 9/00362 |
| | | | | 348/222.1 |
| 2013/0163831 A1* | 6/2013 | Tanaka | ............... | G06K 9/00228 |
| | | | | 382/118 |
| 2013/0286218 A1* | 10/2013 | Tsuji | ............... | H04N 5/23296 |
| | | | | 348/169 |
| 2014/0063236 A1* | 3/2014 | Shreve | ............... | G06K 9/00228 |
| | | | | 348/143 |
| 2016/0342828 A1* | 11/2016 | Lee | ............... | G06K 9/627 |

OTHER PUBLICATIONS

Joseph Tighe, et al.—Super Parsing: Scalable Nonparametric Image Parsing with Superpixels; European Conference on Computer Vision 2010.

Paul Viola, et al—Rapid Object Detection using a Boosted Cascade of Simple Features; Computer Vision and Pattern Recognition 2001.

Pedro F. Felzenszwalb, et al.—Object Detection with Discriminatively Trained Part-Based Models, IEEE Transactions on Pattern Analysis and Machine Intelligence, vol. 32, No. 9, Sep. 2010.

Yi Yang—Articulated Human Detection with Flexible Mixtures of Parts, Computer Vision and Pattern Recognition 2011.

Svetlana Lazebnik, et al.—Beyond Bags of Features, Spatial Pyramid Matching for Recognizing Natural Scene Categories, CVPR 2006.

Aude Oliva and Antonio Torralba—Modeling the shape of the scene: a holistic representation of the spatial envelope, European Conference on Computer Vision 2010.

Lubomir Bourdev, et al.—Detecting People Using Mutually Consistent Poselet Activations, European Conference on Computer Vision 2010.

\* cited by examiner

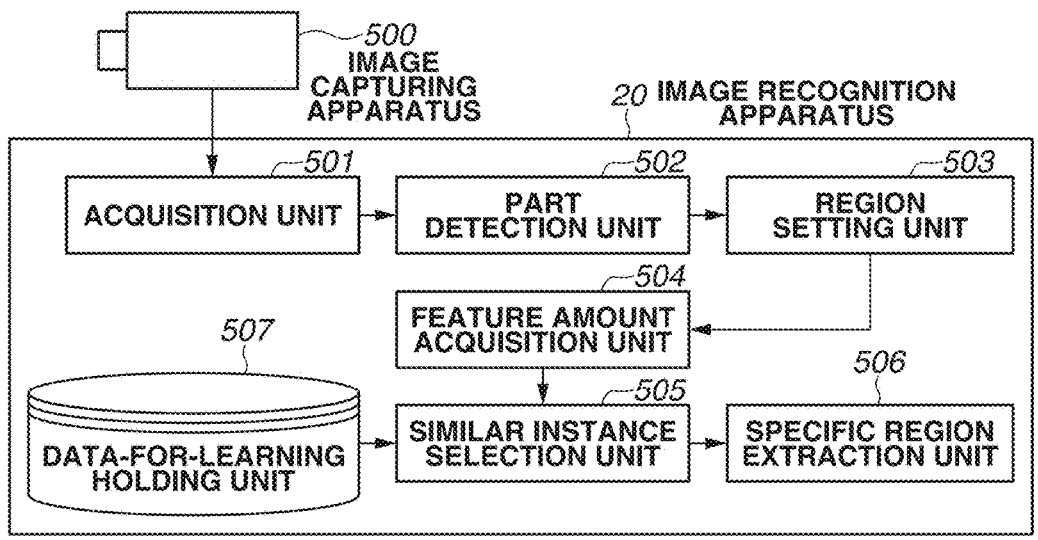
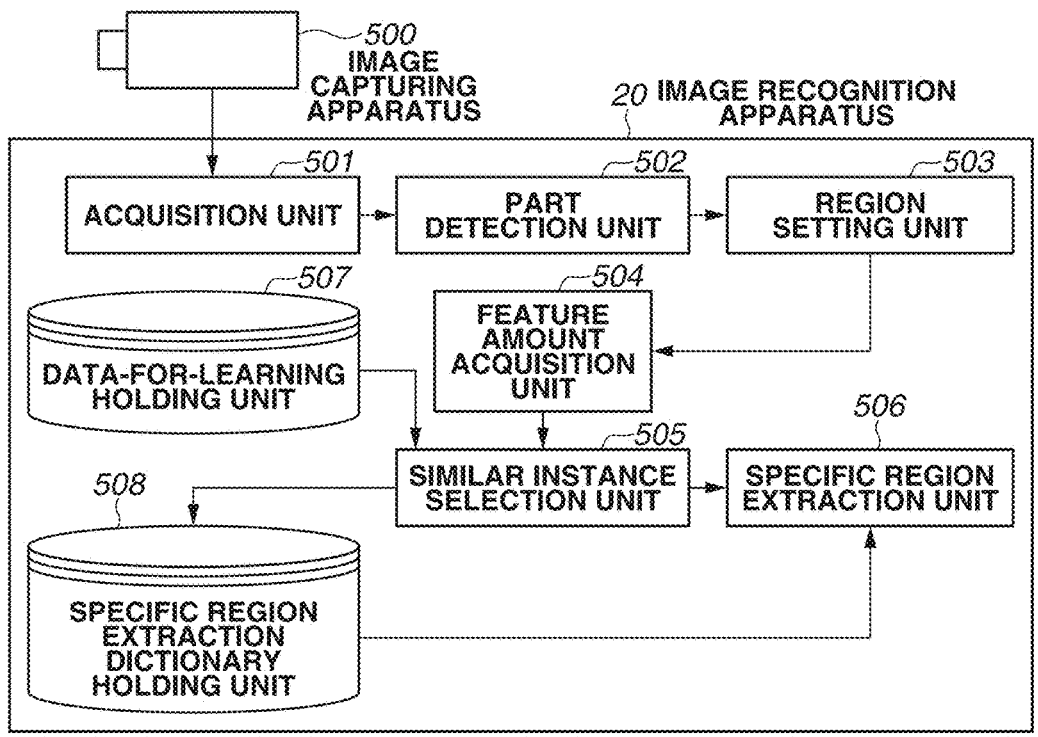

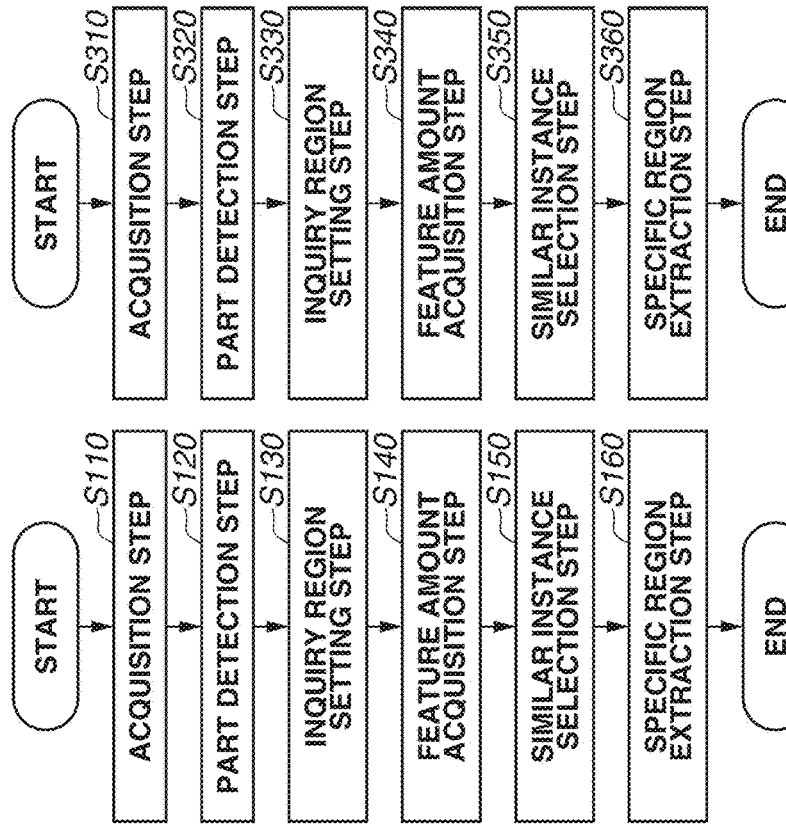

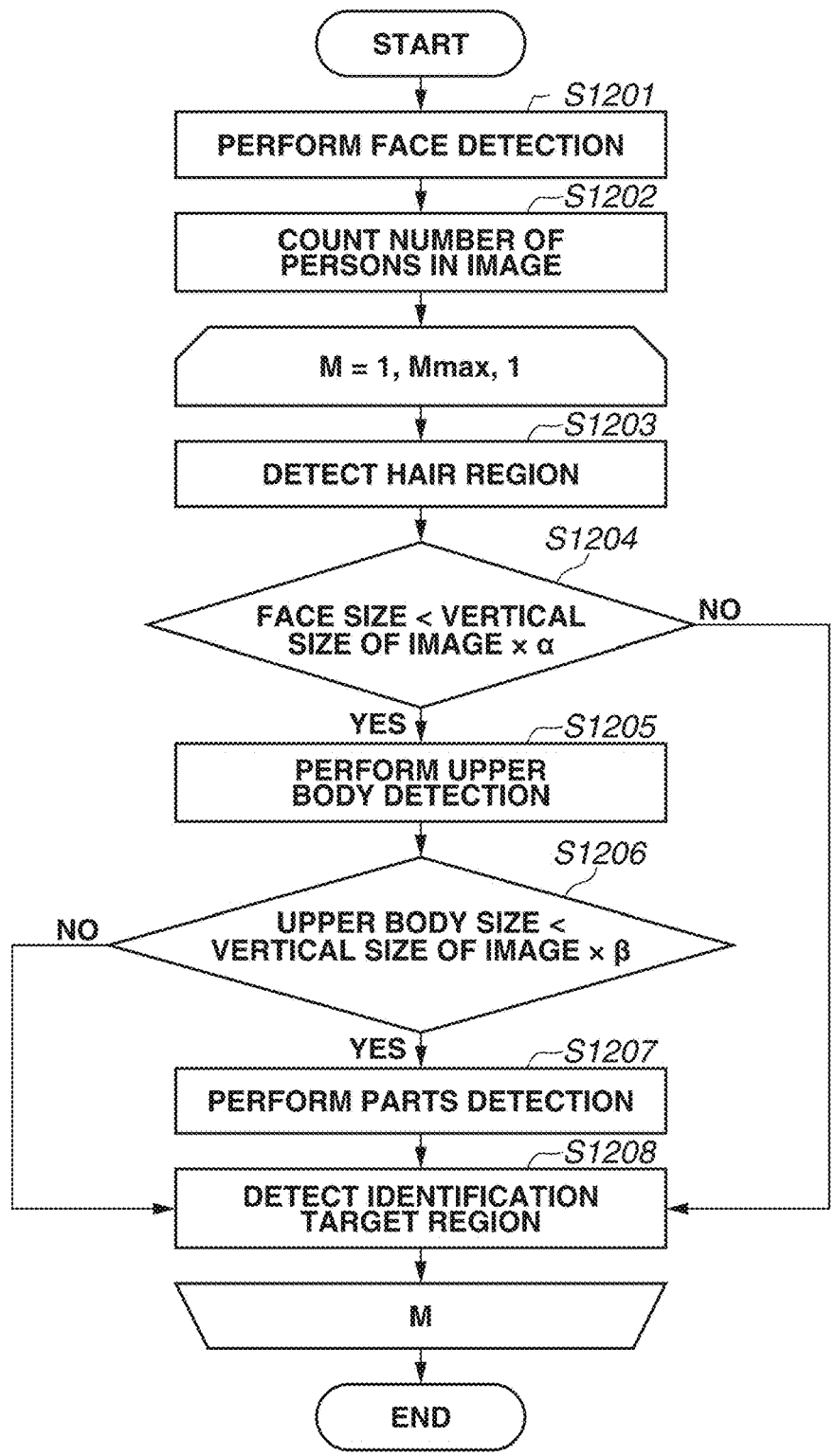

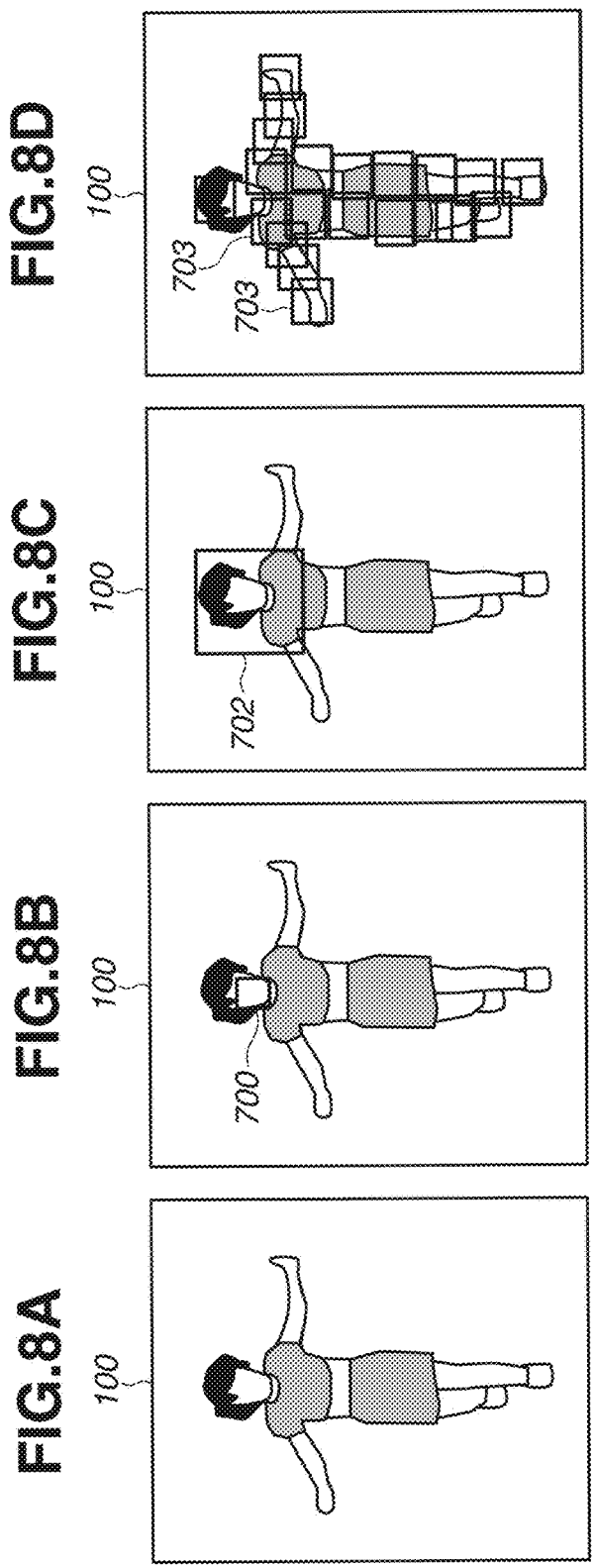

FIG.15A FIG.15B
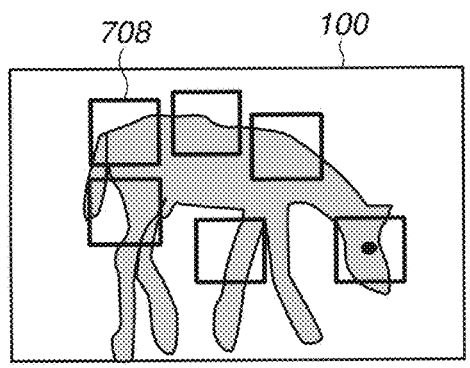
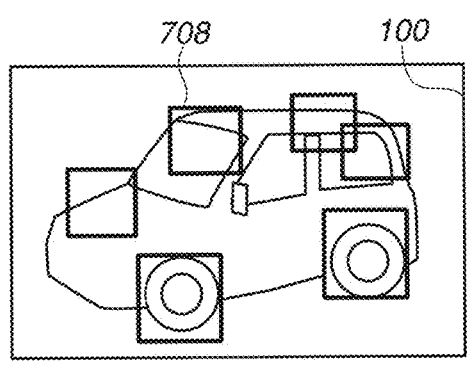

I'M AGE RECOGNITION METHOD, IMAGE
RECOGNITION APPARATUS, AND
RECORDING MEDIUM

BACKGROUND OF THE INVENTION

Field of the Invention

The present invention relates to a technique for dividing an image into regions according to predefined classes.

Description of the Related Art

Conventionally, there is known a process in which an image is divided into a plurality of small regions and then classes relating to the classification of objects are identified for post processing such as image scene recognition and image quality correction suitable for the objects. In a method discussed in (R. Socher, "Parsing Natural Scenes and Natural Language with Recursive Neural Networks", International Conference on Machine Learning, 2011.), first, an input image is divided into small regions called superpixels (SPs) based on color information and texture information. Then, a class of each divided small region is identified using a classifier called recursive neural networks (RNNs).

However, performing the identification based only on feature amounts of the small regions sometimes leads to false detection despite high reliability (high identification score, high identification likelihood). A technique is known in which a similar image is selected using global feature amounts of an image and then a class of each region of an identification target image is estimated based on class information about each region in the similar image. In (J. Tighe, "SuperParsing: Scalable Nonparametric Image Parsing with Superpixels", European Conference on Computer Vision, 2010.), selecting a similar image based on global feature amounts of an identification target image and then determining a class of each small region of the identification target image by use of the selected similar image is discussed.

However, when a search for a similar image is performed based only on global feature amounts of an image as in the method discussed in (J. Tighe, "SuperParsing: Scalable Nonparametric Image Parsing with Superpixels", European Conference on Computer Vision, 2010.), a specific region of an identification target sometimes cannot be extracted accurately. For example, in a case where a skin region of a black person in a beach scene image is to be extracted, if a search for a similar image is performed based only on global feature amounts of the image, an image of a beach is selected as a similar image. In such a case, it is not possible to accurately extract a specific region (skin region) of an identification target (human body), compared to a case where an image of a black person has been selected as a similar image.

SUMMARY OF THE INVENTION

According to an aspect of the present invention an image recognition method for an image recognition apparatus includes detecting at least one part of an identification target from an identification target image, setting an inquiry region based on the detected part, acquiring a feature amount of the set inquiry region, selecting at least one instance image corresponding to the identification target image based on the acquired feature amount, and specifying a specific region of the identification target from the identification target image based on the selected instance image.

In an image recognition apparatus and an image recognition method for enabling highly accurate extraction of a specific region at the time of selecting a similar image from an identification target image and extracting a specific region using the similar image, part detection is performed on the identification target image, an inquiry region is set from the detected part region, and a similar instance image is selected from data-for-learning based on a feature amount of the inquiry region. Then, a model (detector) is generated based on the selected similar instance image, and a specific region of the identification target image is extracted. Further features of the present invention will become apparent from the following description of exemplary embodiments with reference to the attached drawings.

BRIEF DESCRIPTION OF THE DRAWINGS

FIGS. 4A and 4B are block diagrams each illustrating a functional configuration of an image recognition apparatus according to an exemplary embodiment.

FIGS. 5A, 5B, and 5C are flow charts each illustrating details of image recognition processing according to an exemplary embodiment.

FIG. 6 is a flow chart illustrating details of part detection processing according to the first exemplary embodiment.

FIGS. 8A, 8B, 8C, and 8D each illustrate an example of a detection result of the part detection processing according to the first exemplary embodiment.

FIGS. 15A and 15B each illustrate other examples of a specific region of an identification target according to other exemplary embodiments.

DESCRIPTION OF THE EMBODIMENTS

Figure 1:
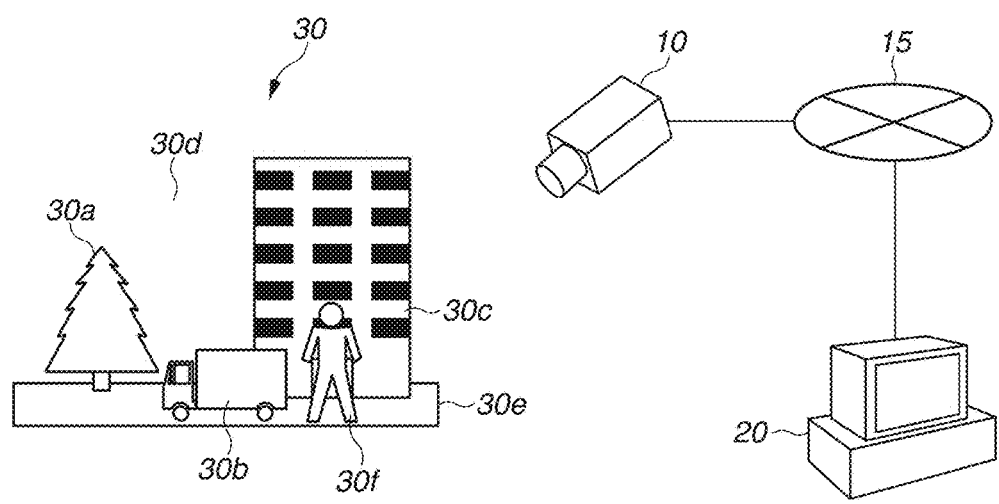
FIG. 1 illustrates a configuration of an image recognition system according to a first exemplary embodiment.

A first exemplary embodiment of the present invention is described in detail with reference to the drawings. FIG. 1 illustrates a configuration of an image recognition system according to the present exemplary embodiment. In the image recognition system according to the present exemplary embodiment, a camera 10 and an image recognition apparatus 20 are connected with each other via a network 15. The camera 10 and the image recognition apparatus 20 may be integrally formed. The camera 10 captures an identification target image to be processed by the image recognition apparatus 20. In FIG. 1, an example in which the camera 10 captures a scene (capturing condition) 30 is illustrated. In FIG. 1, a tree 30a, a car 30b, a building 30c, a sky 30d, a road 30e, a human body (body) 30f, etc. exist as objects in a field of view (image capturing range). The image recognition apparatus 20 extracts a specific region of an identification target object in the scene 30 captured (imaged) by the camera 10.

In the present exemplary embodiment, it is assumed that the identification target object is a human body, and the specific region is a skin region of the human body. However, the identification target object is not limited to a human body, and the specific region is not limited to a skin region and may be, for example, a hair region or a clothing region. Further, the image recognition apparatus 20 is not limited to the image recognition apparatus that processes an image captured by the camera 10 as an identification target image and, for example, image data input from an apparatus or a medium other than the camera 10 or image data stored in advance in the image recognition apparatus 20 may be processed by the image recognition apparatus 20 as an identification target image.

Figure 2A:
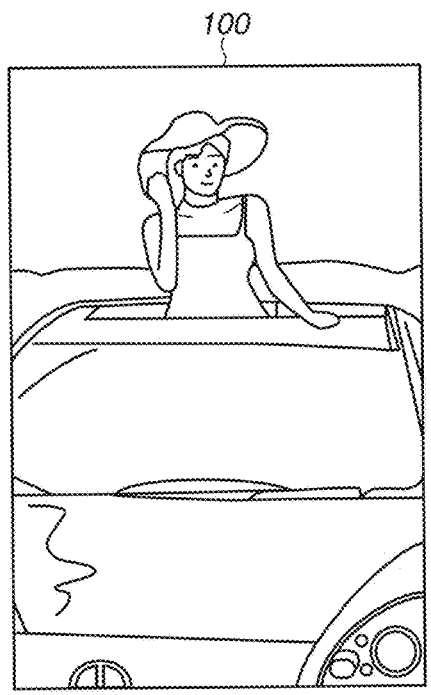
FIGS. 2A and 2B each illustrate an identification target image according to the first exemplary embodiment.
Figure 2B:
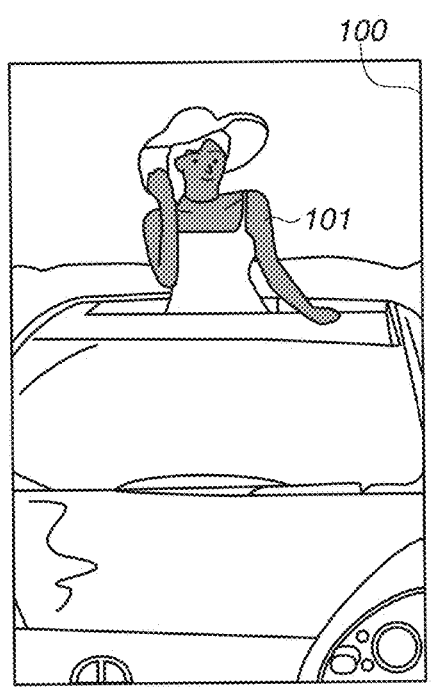

FIGS. 2A and 2B each illustrate an example of an identification target image according to the present exemplary embodiment. In the present exemplary embodiment, as illustrated in FIG. 2A, a skin region of a human in an identification target image 100 captured by the camera 10 is extracted as a specific region. FIG. 2B illustrates an example of a skin region 101 extracted by an image recognition method according to the present exemplary embodiment. As used herein, the "skin region" is an exposed skin region as illustrated in FIG. 2B. While organ regions such as the eyes and mouth are included in the skin region in FIG. 2B, the organ regions may not have to be included.

Figure 3:
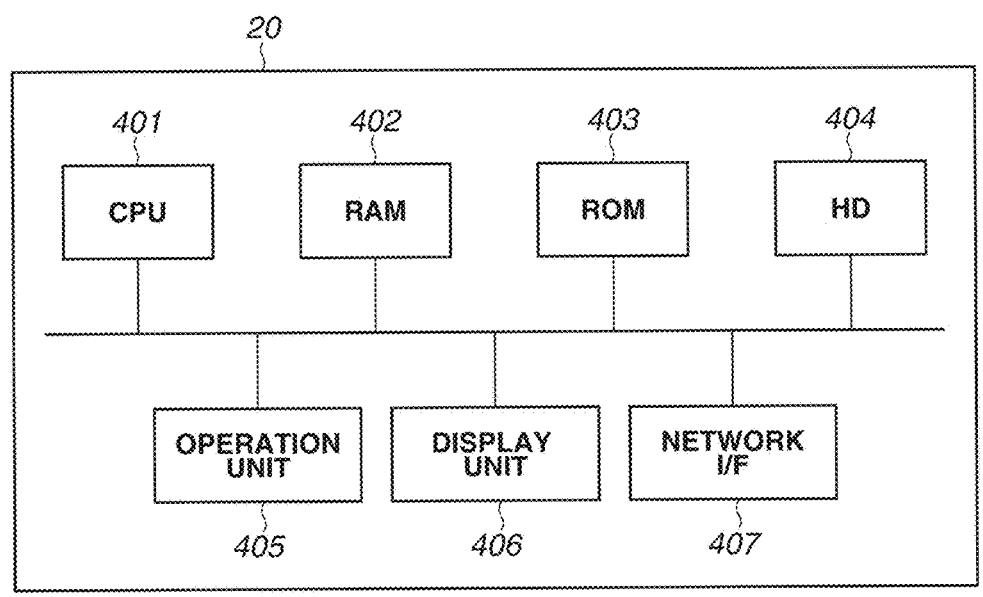
FIG. 3 is a block diagram illustrating a hardware configuration of an image recognition apparatus according to the first exemplary embodiment.

FIG. 3 is a schematic block diagram illustrating a hardware configuration of the image recognition apparatus according to the present exemplary embodiment. A central processing unit (CPU) 401 controls the entire image recognition apparatus 20. The CPU 401 executes a program stored in a read-only memory (ROM) 403 or a hard disk (HD) 404, for example, to realize a functional configuration of the image recognition apparatus 20 and processing of a flow chart relating to the image recognition apparatus 20, which will be described below. A random access memory (RAM) 402 is a storage area configured to function as a work area for the CPU 401 to load and execute a program. The ROM 403 is a storage area for storing a program to be executed by the CPU 401 and the like. The HD 404 is a storage area for storing various types of programs required at the time of execution of processing by the CPU 401 and various types of data including data of threshold values. An operation unit 405 receives user input operations. A display unit 406 displays information of the image recognition apparatus 20. A network interface (I/F) 407 connects the image recognition apparatus 20 to an external apparatus.

FIGS. 4A and 4B are schematic block diagrams each illustrating a functional configuration of the image recognition apparatus 20 according to an exemplary embodiment. FIG. 4A is a schematic block diagram according to the present exemplary embodiment. In FIGS. 4A and 4B, an image capturing apparatus 500 corresponding to the camera 10 illustrated in FIG. 1 is also illustrated. The image capturing apparatus 500 corresponds to the camera 10 in FIG. 1 and is configured to capture an identification target image. The image recognition apparatus 20 according to the present exemplary embodiment includes an acquisition unit 501, a part detection unit 502, a region setting unit 503, a feature amount acquisition unit 504, a similar instance selection unit 505, a specific region extraction unit 506, and a data-for-learning holding unit 507. The data-for-learning holding unit 507 may be configured to be connected as a non-volatile storage device to the image recognition apparatus 20. The details of the foregoing functional units included in the image recognition apparatus 20, will be described below with reference to flow charts illustrated in FIGS. 5A, 5B, and 5C.

FIGS. 5A, 5B, and 5C are flow charts each illustrating a flow of image recognition processing to be executed by the image recognition apparatus 20 according to an exemplary embodiment. FIG. 5A is a flow chart according to the present exemplary embodiment. In FIG. 5A, first, in acquisition step S110, as illustrated in FIG. 1, the acquisition unit 501 acquires as an identification target image 100 an image of the scene 30 captured by the image capturing apparatus 500. The identification target image 100 may be an image stored in an external apparatus (not illustrated). In this case, the acquisition unit 501 acquires as the identification target image 100 the image read from the external apparatus. An image stored in the external apparatus may be, for example, an image captured in advance by the image capturing apparatus 500 or may be an image acquired using other methods such as a method that uses an image acquired via a network and then stored. Further, there may be a case where the acquisition unit 501 acquires scene information and imaging information in addition to an identification target image. This case will be described later.

Next, in part detection step S120, the part detection unit 502 performs part detection on the identification target image 100 acquired by the acquisition unit 501. The details of the part detection processing performed by the part detection unit 502 in part detection step S120, will be described with reference to FIG. 6. In the present exemplary embodiment, an example will be described in which an identification target is a human body and the part detection processing is performed thereon.

In step S1201 in FIG. 6, face detection is performed on the identification target image 100. The face detection may be performed using, for example, a face detector using Haar-like features discussed in "P. Viola, "Rapid Object Detection using a Boosted Cascade of Simple Features", Computer Vision and Pattern Recognition, 2001". In subsequent steps, processing is performed on each face-detected region detected in step S1201. Next, in step S1202, the number of persons in the identification image is counted. For example, the number of detected regions having a higher reliability (score) than a predetermined threshold value among the face-detected regions detected in step S1201 may be counted.

Figure 7:
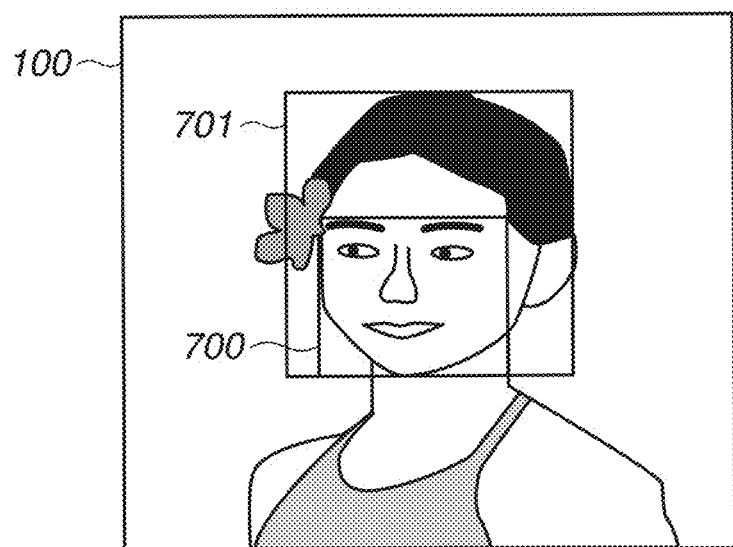
FIG. 7 illustrates hair region setting processing according to the first exemplary embodiment.

In step S1203, a hair region 701 is set to each face-detected region 700 detected in step S1201. FIG. 7 illustrates the hair region setting processing S1203. In the present exemplary embodiment, in a case where the face-detected region 700 is detected in the identification target image 100 as illustrated in FIG. 7, a nearby region is set as the hair region 701. In an alternative method, the hair region 701 may be set to have a predetermined size that is preset according to the face size estimated at the time of the face detection, or may be set by extracting a high-frequency region around the face position. The hair region 701 does not have be set to exactly include the entire region of hair and only needs to include a part of the hair. The hair region set in step S1203 will be used in inquiry region setting processing, which will be described below. While the hair region is described as an example of a region to be set in step S1203, any region that contains a non-skin region in a person region may be set. For example, a clothing region may be detected, or organ detection may be performed to detect an organ region.

In step S1204, it is checked whether the size of each face-detected region detected in step S1201 is smaller than a predetermined percentage of the vertical size of the image. If the size of the detected face-detected region is smaller (YES in step S1204), the processing proceeds to step S1205, and upper body detection is performed.

In step S1205, upper body detection is performed. In the upper body detection, deformable part models discussed in "P. Felzenswalb, "Object Detection with Discriminatively Trained Part Based Models", IEEE Conference on Computer Vision and Pattern Analysis and Machine Intelligence, 2010." may be used. Alternatively, for example, learning images of only upper bodies may be collected, and histograms of oriented gradients (HOG) templates may be learned in advance to perform the detection using the learned HOG templates. Further, alternatively, a detector of a part detector described below that is configured to detect only upper body part may be used. Further, while the example of performing upper body detection is described in the present exemplary embodiment, detection of other regions such as head portion detection, etc. may be performed. A head portion has an omega shape from the head to the shoulders and may be detected with the HOG templates or the like.

In step S1206, whether to perform part detection (orientation estimation) is determined based on a result of the upper body detection. Specifically, if the size of the detected upper body is smaller than the vertical size of the image×β (YES in step S1206), the processing proceeds to step S1207, and part detection (orientation estimation) is performed. The value β is a real number and is predefined.

In the part detection (orientation estimation) S1207, a method is used in which each part of a human body such as an upper arm, leg is detected and then the position of each detected part is estimated to estimate the orientation. As to a specific method, for example, an orientation estimation technique discussed in "Y. Yang, "Articulated Human Detection with Flexible Mixtures of Parts", Computer Vision and Pattern Recognition, 2011." may be used.

FIGS. 8A, 8B, 8C, and 8D each illustrate an example of a detection result of the part detection processing performed by the part detection unit 502. FIG. 8A illustrates an identification target image 100. Further, FIGS. 8B to 8D respectively illustrate results of face detection (face-detected region 700), upper body detection (upper body region 702), and part detection (part regions 703) performed on the identification target image 100.

Figure 9C:
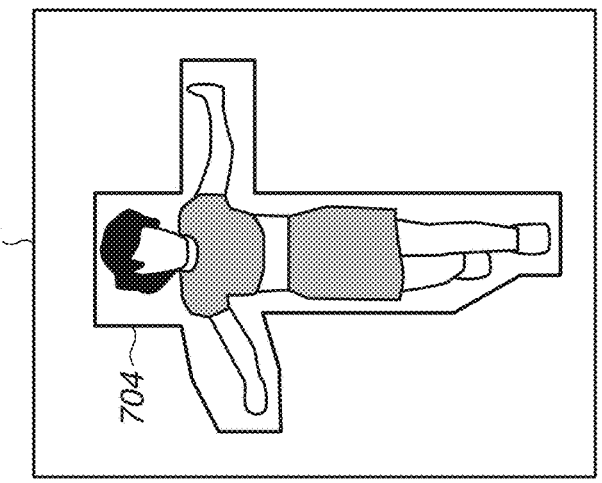
FIGS. 9A, 9B, and 9C each illustrate an example of a detected identification target region according to the first exemplary embodiment.
Figure 9B:
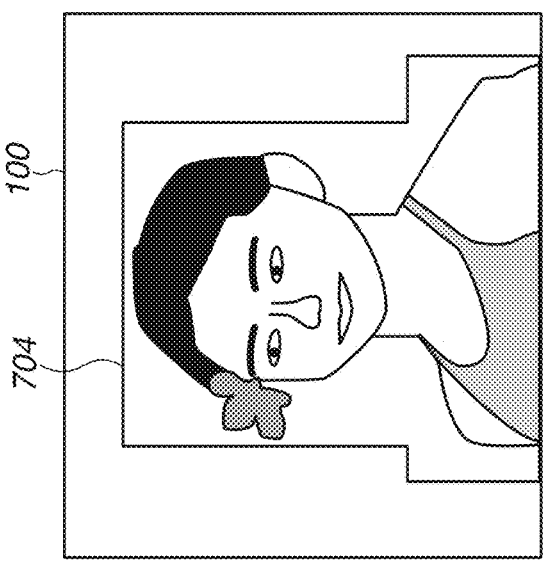
Figure 9A:
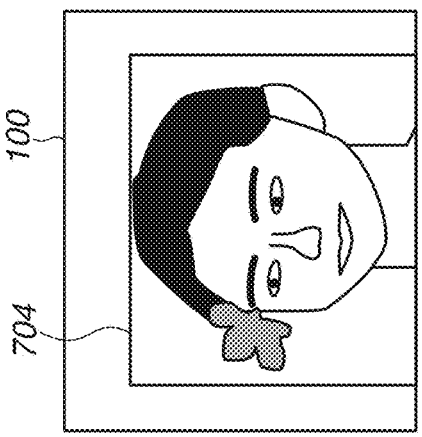

In step S1208, an identification target region is detected using at least one of the results of face detection, hair region detection, upper body detection, and part detection. FIGS. 9A, 9B, and 9C each illustrate an example of an identification target region detected by the processing S1208. In step S1208, as illustrated in FIGS. 9A to 9C, regions corresponding to a face close-up, a bust close-up, and a full-body image, respectively, are cut as identification target regions 704. A region to be cut in step S1208 does not necessarily have to be detected along a contour of a person region, and may be detected so that a human body region for setting an inquiry region can be set in step S130, which is the next step in FIG. 5A.

While the human body detection modules are sequentially operated in the detailed flow of part detection step S120 described above, the human body detection modules may be operated in parallel and integrated, or only one human body detection module may be used. Further, while the modules are switched based on the detected size, the modules may be switched based on the reliability of each detection result.

Figure 10A:
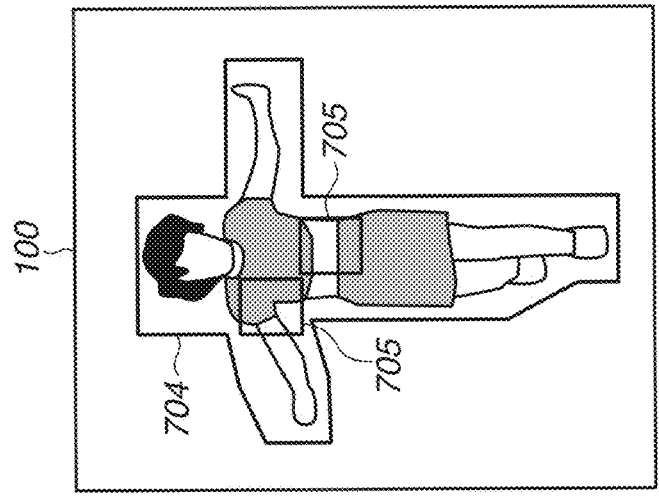
FIGS. 10A, 10B, and 10C each illustrate an example of an inquiry region set by a region setting unit according to the first exemplary embodiment.
Figure 10B:
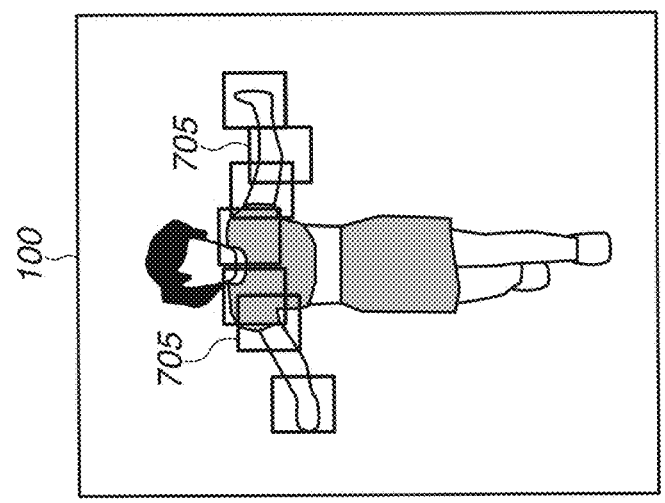
Figure 10C:
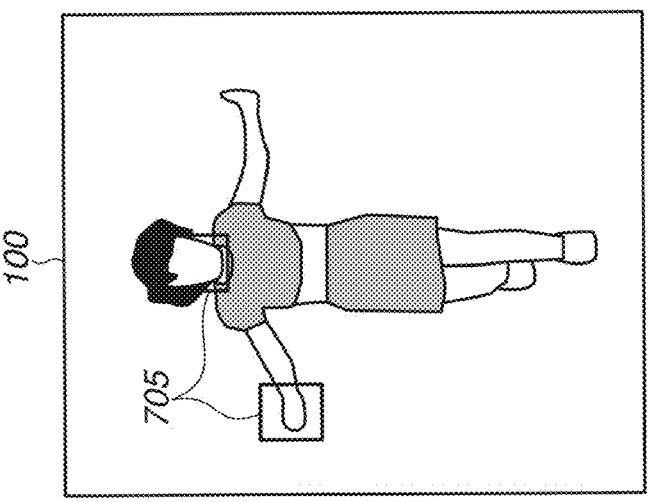

Referring back to FIG. 5A, in inquiry region setting step S130, the region setting unit 503 sets an inquiry region based on the results detected in part detection step S120. In the present exemplary embodiment, the region setting unit 503 sets an inquiry region within a range where the identification target exists, with respect to the identification target region set in part detection step S120. More specifically, the identification target region may directly be set as an inquiry region, or the regions detected by the respective human body detection modules or a combination of the detected regions may be set as an inquiry region. FIGS. 10A, 10B, and 10C each illustrate an example of an inquiry region set by the region setting unit 503. For example, the region setting unit 503 sets a combination of a face region and a part region as an inquiry region 705 as illustrated in FIG. 10A. Alternatively, the region setting unit 503 selects two or more part regions to set the selected regions as an inquiry region 705 as illustrated in FIG. 10B. Alternatively, the region setting unit 503 randomly sets a partial region or a combination of partial regions with respect to the identification target region 704 as illustrated in FIG. 10C. While the examples, in which an inquiry region is set in the form of a rectangular region, are described, the inquiry region is not limited to a rectangular region. For example, a new small region such as superpixels may be acquired, and the small region or a combination of the small regions may be set.

Next, in feature amount acquisition step S140, the feature amount acquisition unit 504 acquires a feature amount from the inquiry region set in inquiry region setting step S130. Examples of a feature amount that may be used include a statistic value of a color feature or a texture feature in each inquiry region. In a case where the inquiry region is a combination of a plurality of regions, statistic values of the respective regions may be acquired separately or collectively. In the present exemplary embodiment, for example, the following methods are used.

components of a red/green/blue (RGB) color space, a hue/saturation/value (HSV) color space, a lightness/a/b (Lab) color space, and a YCbCr color space, and Gabor filter response and Laplacian of Gaussian (LoG) filter response. In this case, the color feature has 4 (color spaces)×3 (components)=12 dimensions, and the number of dimensions of the filter response corresponds to the number of the Gabor filters and the LoG filters. In order to perform characterization on each region, a statistic value is calculated from a feature amount acquired from each pixel in a region, and four statistic values (i.e., mean value, standard deviation, skewness, and kurtosis) are used that are. The skewness is a statistic value that indicates the degree of asymmetry of a distribution, and the kurtosis is a statistic value that indicates the degree of concentration of a distribution around the mean value. Accordingly, the color feature has 48 dimensions (i.e., 4 (color spaces)×3 (components)×4 (statistics)= 48) dimensions, and the number of dimensions of the texture feature is (the number of filter responses)×4 (statistic values). Further, in addition thereto, the coordinates of the center of gravity of an inquiry region, the area of a small region may be used as a feature amount. In a case where a combination is set as an inquiry region, the coordinates of the centers of gravity of both regions of the combination may be held. Alternatively, one of the inquiry regions may be fixed to a characteristic position such as a face region, and a difference (offset) in the coordinates of the center of gravity from the other one of the inquiry regions may be held.

Next, in similar instance selection step S150, the similar instance selection unit 505 selects a similar instance image based on the feature amounts acquired from the respective inquiry regions of the identification target image. First, a method of selecting a similar instance image based on the feature amounts of the inquiry regions set in inquiry region setting step S130 will be described. In the present exemplary embodiment, it is assumed that N pieces of inquiry regions are set with respect to an identification target region in the identification target image. A set S of inquiry regions of an identification target region in an identification target image is expressed by formula 1:

$$S=\{S_1, S_2, \ldots, S_N\} \qquad \text{(formula 1)},$$

where I is the identification target image and $S_n$ (n=1, 2, ..., N) is an inquiry region. In a case where the identification target region is directly set as an inquiry region, N can be considered to be N=1. Further, the inquiry regions may be set to respectively correspond to the detection modules, such as a face region, a hair region, an upper body region, an object region. In a case of a pair of inquiry regions, for example, a feature amount f ($S_n$) acquired from the inquiry regions can be expressed by formula 2 or 3 below:

$$f(S_{n1})+f(S_{n2}) \qquad \text{(formula 2)}$$

$$f(S_1+S_{n2}) \qquad \text{(formula 3)}$$

where $S_{n1}$ and $S_{n2}$ denote the inquiry regions.

Next, a similarity between the identification target image and each learning image is calculated. For convenience, an example case will be described in which not a pair but the identification target region is directly set as an inquiry region. A similarity between the identification target image and a learning image is determined based on similarities in the feature amounts between the respective inquiry regions of the learning image and the respective inquiry regions of the identification target image. The feature amounts of the respective inquiry regions of the learning images are acquired in advance by learning processing, which will be described below, and stored in the data-for-learning holding unit 507.

An inquiry region of a learning image is denoted by $S_{lm}$ (l=1, 2, ..., L, m=1, 2, ..., M), where l is an index of the learning image, and m is an index of an inquiry region set to the learning image. While the number of inquiry regions set to a learning image is set to M and is the same for all learning images in the present exemplary embodiment, the number may be different for each learning image. An inquiry region of a learning image that has the highest similarity to an inquiry region of the identification target image may be selected as a similar instance image, or a learning image that has the largest sum (mean value) of similarities to a plurality of inquiry regions of the identification target image may be selected as a similar instance image. In the former case, the inquiry region of the learning image that is to be selected is expressed by formula 4, where each of $$S_{l\tilde{m}}$$

is an inquiry region of a learning image that has the highest similarity. Further, in the latter case, the learning image that is to be selected is expressed by formula 5, and a learning image that has a high similarity to the identification target image can be selected based on formula 5. While the example has been described in which one similar instance image is selected according to formulas 4 and 5, a plurality of similar instance images may be selected.

$$S_{l\tilde{m}} = \underset{l,m}{\text{argmax}}\, \text{Similarity}(f(S_n), f(S_{lm})) \qquad \text{(formula 4)}$$

$$S_{\tilde{l}} = \underset{l}{\text{argmax}} \sum_{n} \underset{m}{\text{argmax}}\, \text{Similarity}(f(S_n), f(S_{lm})) \qquad \text{(formula 5)}$$

Next, in specific region extraction step S160, the specific region extraction unit 506 extracts a specific region in the identification target image based on the similar instance image selected in similar instance selection step S150 and supervisory data of the selected similar instance image. In the present exemplary embodiment, two methods for extracting a specific region will be described. The supervisory data refers to data that indicates which pixel in the image is a specific region. Further, a target to be subjected to the identification may be a pixel or a region of the identification target region in the identification target image, or the identification may be performed on all pixels or regions in the identification target image.

In the first method, a distribution that a specific region has is estimated based on a specific region in the acquired similar instance image to generate a model (detector), and a specific region in the identification target image is extracted using the model (detector). For example, a distribution that a specific region in the similar instance image has may be estimated by fitting a Gaussian distribution to a color distribution of the specific region in the similar instance image. Specifically, RGB values of respective pixels of the specific region of the similar instance image may be acquired, and the mean value and standard deviations of a Gaussian distribution for the RGB values may be estimated using maximum likelihood estimation. While RGB values of respective pixels are used in the present exemplary embodiment, the estimation may be performed for not each pixel but each small region, or a Gaussian distribution may be estimated in a high-dimensional space with the values of different color spaces and the texture feature described above in feature amount acquisition step S140. Further, while RGB values and feature amounts of each pixel or each small region may be acquired as described above, a distribution may be estimated also by vectorizing values of differences from RGB values or feature amounts of nearby pixels or small regions. Alternatively, a Gaussian mixture model (hereinafter, "GMM") including a plurality of Gaussian distributions may be estimated. A probability density function by GMM is expressed by formula 6 below:

$$P(x; \theta) = \sum_{j} \alpha_j N(x; \mu_j, \Sigma_j) \qquad \text{(formula 6)}$$

where $$\sum_{j} \alpha_j$$

satisfies formula 7 below. Further, θ in formula 6 is formula 8. Further, N(·; μ, Σ) is a multidimensional normal distribution having a mean vector μ and a covariance matrix Σ and is represented by formula 9.

$$\sum_i \alpha_j = 1 \quad \text{(formula 7)}$$

$$\theta = \left\{\alpha_j, \mu_j, \sum_j \mid j = 1, 2, \ldots, GMMnum\right\} \quad \text{(formula 8)}$$

$$N\left(\bullet; \mu, \sum\right) = (2\pi)^{-d/2}\left|\sum\right|^{-1/2}\exp\left\{-\frac{1}{2}(x-\mu)^T\sum^{-1}(x-\mu)\right\} \quad \text{(formula 9)}$$

In formulas 6 to 9, j is an index that indicates a Gaussian kernel, GMMnum is the number of Gaussian kernels, αj is a mixture ratio of a Gaussian kernel j, μj is a mean value of a Gaussian kernel j, and Σj is a covariance matrix of a Gaussian kernel j.

The probability density function may be estimated using an expectation-maximization (EM) method. The processing to be performed in E step and M step is described below.
E Step:

$$P(j \mid x_n; \theta^{[t]}) = \frac{\alpha_j^{[t]} N\left(x_n; \mu_j^{[t]}, \sum_j^{[t]}\right)}{\sum_j \alpha_j^{[t]} N\left(x_n; \mu_j^{[t]}, \sum_j^{[t]}\right)} \quad \text{(formula 10)}$$

M Step:

$$\mu_j^{[t+1]} = \sum_n P(j \mid x_n; \theta^{[t]}) x_n w(x_n) \quad \text{(formula 11)}$$

$$\sum_j^{[t+1]} = \frac{\sum_n P(j \mid x_n; \theta^{[t]})(x_n - \mu_j^{[t]})(x_n - \mu_j^{[t]})^T w^2(x_n)}{\sum_n P(j \mid x_n; \theta^{[t]})} \quad \text{(formula 12)}$$

$$\alpha_j^{[t+1]} = \sum_n P(j \mid x_n; \theta^{[t]}) w(x_n) \quad \text{(formula 13)}$$

In formulas 10 to 13, w is a prior distribution and is represented by formula 14 below:

$$w(x_n) \propto Pr(x_n), \sum_n w(x_n) = 1 \quad \text{(formula 14)}$$

where t is an iteration of E and M steps, and an appropriate initial value may be given to $$\alpha_j^{[0]}, \mu_j^{[0]}, \Sigma_j^{[0]}$$

to repeat E and M steps a predetermined number of times. Alternatively, if a change from the previous result is equal to or smaller than a threshold value, it may be determined that the convergence is reached, and the processing may be ended. Further, n is an index of observation data and, in the present exemplary embodiment, denotes a pixel of a specific region of a similar instance image. Then, based on the consequently acquired probability density function, the likelihood as to whether each pixel of the identification target region of the identification target image is a specific region, is calculated. The specific region extraction unit 506 may output the calculated likelihood or may extract as a specific region a region having a higher likelihood than a predetermined threshold value and outputs the extracted specific region.

In the second method, the probability as to whether each pixel (or region) of the identification target image is a specific region (skin region) is calculated according to the acquired probability density function. Alternatively, the probability is calculated based on Bayes' theorem using formula 15 below:

$$P(C_S \mid v) = \frac{P(v \mid C_S) P(C_S)}{P(v \mid C_S) P(C_S) + P(v \mid C_{NS}) P(C_{NS})} \quad \text{(formula 15)}$$

where $P(C_S|v)$ indicates the probability that a pixel (or region) is a specific region (skin region). Further, v is a value of a pixel or region of the identification target image. Specifically, v may be a RGB value or feature amount of a pixel or region. Further, $P(v|C_S)$ indicates the probability (frequency) that a pixel or region that is a specific region of a selected similar instance image is v, and $P(v|C_{NS})$ indicates the probability (frequency) that a pixel or region that is a non-specific region is v. Further, $P(C_S)$ and $P(C_{NS})$ are prior probabilities and may be 0.5 or probabilities of occurrence of a specific region and a non-specific region of the similar instance image may be used. An example in which a classifier learned during an offline time is used in the specific region extraction will be described in a second exemplary embodiment. As to a final specific region, a probability value (real number of 0 to 1) may be output, or a region having a probability equal to or higher than a predefined threshold value may be specified as a specific region.

Figure 11A:
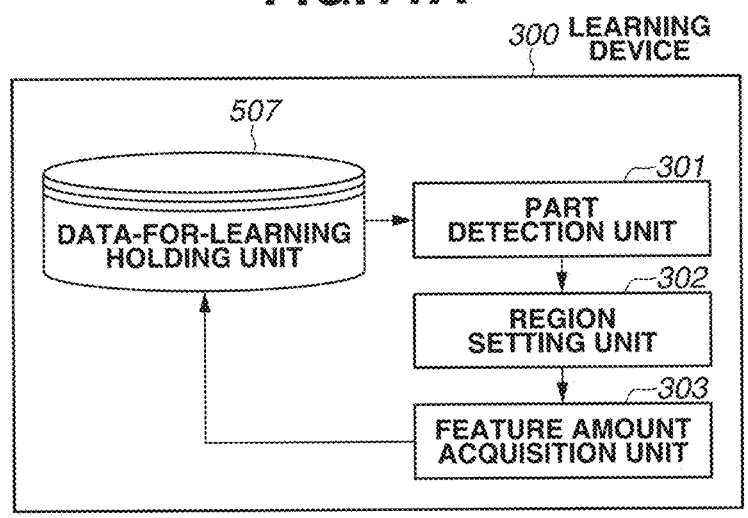
FIGS. 11A and 11B are block diagrams each illustrating a functional configuration of a learning device according to an exemplary embodiment.
Figure 11B:
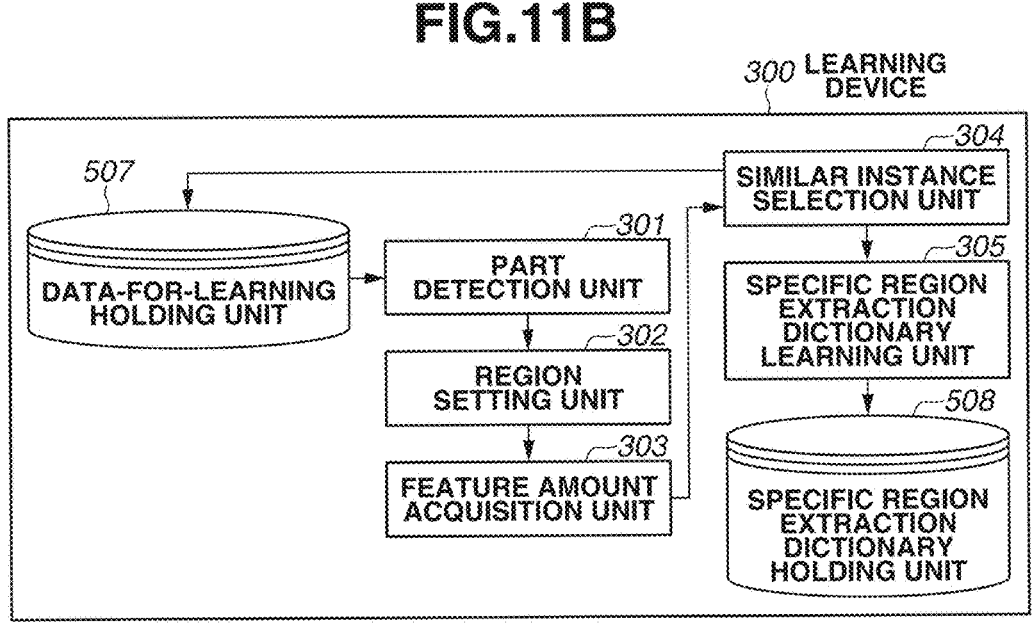

Next, the learning processing during an offline time is described. FIGS. 11A and 11B are schematic block diagrams each illustrating a functional configuration of a learning device 300 according to an exemplary embodiment. FIG. 11A is a schematic block diagram according to the present exemplary embodiment. The learning device 300 includes a part detection unit 301, a region setting unit 302, a feature amount acquisition unit 303, and a data-for-learning holding unit 507. The data-for-learning holding unit 507 may be configured to be connected as a non-volatile storage device to the learning device 300. Further, the learning device 300 may be configured to be a device similar to the image recognition apparatus 20 illustrated in FIG. 4A. Further, at this time, the part detection unit 301, the region setting unit 302, and the feature amount acquisition unit 303 may be shared as the part detection unit 502, the region setting unit 503, and the feature amount acquisition unit 504 of the image recognition apparatus 20. Further, the data-for-learning holding unit 507 is shared at an offline time and at an online time.

Figure 12A:
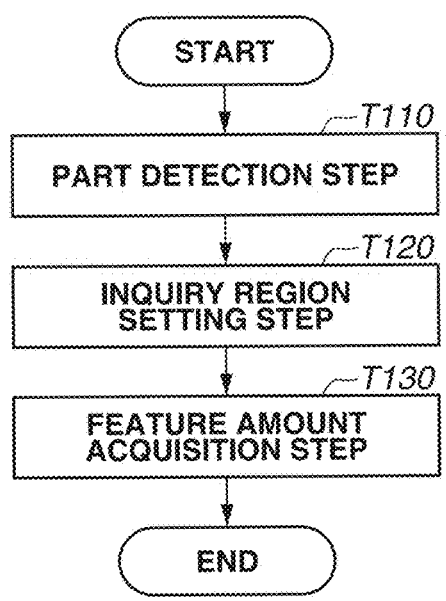
FIGS. 12A and 12B are flow charts each illustrating details of learning processing according to an exemplary embodiment.
Figure 12B:
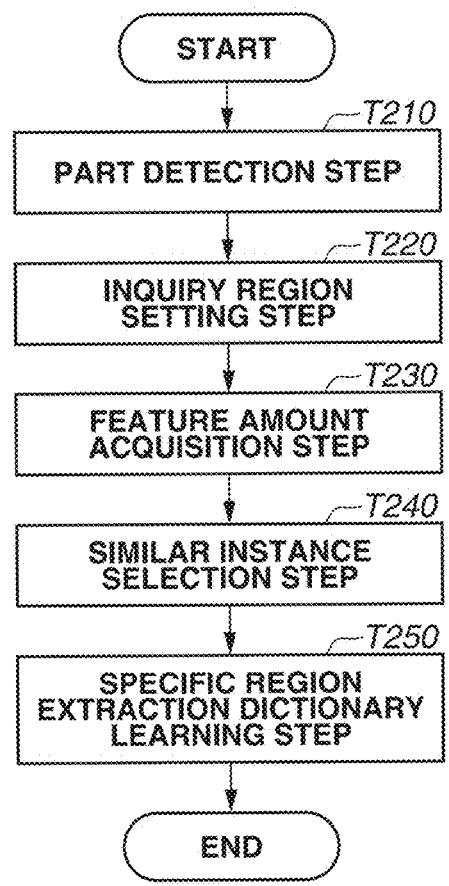

Next, the details of each functional unit included in the learning device 300 will be described with reference to flow charts illustrated in FIGS. 12A and 12B. FIGS. 12A and 12B are flow charts each illustrating learning processing to be performed by a learning device 300 according to an exemplary embodiment. FIG. 12A is a flow chart according to the present exemplary embodiment. First, in part detection step T110, the part detection unit 301 performs part detection on data-for-learning held in the data-for-learning holding unit 507. The data-for-learning contains learning image and, as supervisory data, a specific region of each learning image and a feature amount of the specific region. The processing of part detection step T110 is similar to the processing of part detection step S120 at the time of the recognition, which is described above with reference to FIG. 5A, and a parts detector to be used in part detection step T110 may be similar to the detector used in part detection step S120 at the time of the recognition. Results of the part detection that are detected from the data-for-learning in part detection step T110 are transmitted to the region setting unit 302.

Next, in inquiry region setting step T120, the inquiry region setting unit 302 sets an inquiry region to the data-for-learning from which a part is detected in part detection step T110. A method for setting the inquiry region may be similar to the method used in inquiry region setting step S130 at the time of the recognition. The inquiry regions set to the respective pieces of data-for-learning are transmitted to the feature amount acquisition unit 303.

Next, in feature amount acquisition step T130, the feature amount acquisition unit 303 acquires feature amounts of the inquiry regions of the respective pieces of data-for-learning that are set in inquiry region setting step T120. The feature amounts to be used may be similar to the feature amounts used in feature amount acquisition step T140 at the time of the recognition. The acquired feature amounts are transmitted to the data-for-learning holding unit 507. Then, the acquired feature amounts are used at the time of selecting a similar instance in similar instance selection step T150 at the time of the recognition.

As described above, in the present exemplary embodiment, the image recognition apparatus 20 performs part detection on an identification target image and extracts an identification target region. The image recognition apparatus 20 sets an inquiry region to the extracted identification target region and selects a similar instance image from data-for-learning based on a feature amount of the inquiry region. Then, the image recognition apparatus 20 generates a model (detector) based on the selected similar instance image and extracts a specific region of the identification target image. Use of the similar instance image included in the data-for-learning enables accurate detection of a specific region of the identification target image.

Modified Example

In the first exemplary embodiment, while image feature amounts relating to inquiry regions are described, the image feature amounts are not limited to those described in the first exemplary embodiment. For example, scene information and imaging information about an identification target image containing an inquiry region may additionally be acquired as feature amounts of the inquiry region. As to scene information, a spatial pyramid matching kernel discussed in "S. Lazebnik, C. Schmid, and J. Ponce, "Beyond Bags of Features, Spatial Pyramid Matching for Recognizing", Natural Scene Categories", CVPR, 2006." or a gist feature amount discussed in "A. Oliva and A. Torralba, "Modeling the shape of the scene: a holistic representation of the spatial envelope", International Journal of Computer Vision, 2001." may be used. Further, scene information may be a feature amount obtained by dividing an identification target image into blocks and then generating a histogram of color distributions of the respective blocks. Other than that, various types of a feature amount that represents an entire image and a statistic value obtained by aggregating feature amounts acquired from respective portions of an image may be used as scene information.

Further, imaging information refers to information other than an image acquired at the time of the image capturing by the camera 10 and includes all information acquired by the camera 10 before outputting an image. Examples of imaging information include distance information acquired at the time of focusing, shutter speed information, information about color temperatures and photometric values for the determination of camera parameters at the time of the image capturing, information about camera parameters determined based on the information. In addition thereto, imaging information may be information about the image-capturing data/time, Global Positioning System (GPS) information, information about upside/downside determination by an orientation sensor in a camera, etc.

The above-described scene information is information that is acquired from an entire image, so that the scene information is acquired one for each identification target image. Thus, in a case where scene information is used as a feature amount of an inquiry region, the scene information may be used in combination with a feature amount acquired from the inquiry region. By additionally setting scene information and imaging information as feature amounts of an inquiry region, an image captured under the same image capturing conditions can be acquired as a similar instance image, whereby the accuracy of the specific region detection increases.

In a second exemplary embodiment, instead of generating a model for the specific region extraction during an online time, a plurality of models (classifiers) is generated during an offline time. Then, at the time of the recognition, a specific region of an identification target object is extracted using the plurality of models (classifiers). In the first exemplary embodiment, a model (dictionary) is generated based on a similar instance image selected from learning data at the time of the recognition (during an online time) to extract a specific region of an identification target image. In the present exemplary embodiment, the similarity is calculated in advance between pieces of learning data, and a model (dictionary) is generated based on a plurality of similar instance images. Then, during an online time, a model is selected, or results of the specific region detection performed based on the plurality of models are combined together, based on the similarity to the learning data. Details of the second exemplary embodiment of the present invention will be described below. Configurations that are already described above in the first exemplary embodiment are given the same reference numerals, and description of the configurations is omitted.

FIG. 4B is a schematic block diagram illustrating a functional configuration of an image recognition apparatus 20 according to the present exemplary embodiment. The present exemplary embodiment is different from the first exemplary embodiment in that the image recognition apparatus 20 includes a specific region extraction dictionary holding unit 508 and processing to be performed by a similar instance selection unit 505 and processing to be performed by a specific region extraction unit 506 are different from those in the first exemplary embodiment. Details of the processing of each functional unit will be described below with reference to the flow of the image recognition processing.

A flow chart of image recognition processing to be performed by the image recognition apparatus according to the present exemplary embodiment is similar to the flow chart according to the first exemplary embodiment illustrated in FIG. 5A, except that details of processing to be performed in some steps are different. Acquisition step S110 to feature amount acquisition step S140 according to the present exemplary embodiment are similar to acquisition step S110 to feature amount acquisition step S140 according to the first exemplary embodiment, but similar instance selection step S150 and specific region extraction step S160 are different.

In similar instance selection step S150, the similar instance selection unit 505 compares a feature amount of an inquiry region of an identification target image to a feature amount of an inquiry region set to each piece of data-for-learning and selects a similar instance image. The present exemplary embodiment is different from the first exemplary embodiment in that instead of generating a model (detector) by selecting a similar instance image, a dictionary to be used is selected or the weight of each dictionary is determined in the specific region extraction step S160. For example, it is assumed that there are five specific region extraction dictionaries, and representative images are defined in respective pieces of data-for-learning having learned the specific region extraction dictionaries. The representative images are denoted by similar instance images A to E, respectively, and the similarity between an identification target image I and the similar instance image A is denoted by S(I, A). For example, in a case where the similarity between the identification target image I and each of the similar instance images A to E is as expressed by formula 16 below, a dictionary A having the similar instance image A as the representative image may be selected, or a weighed mean value of results of the dictionaries may be calculated based on the similarity.

$$S(I,A)=0.8, S(I,B)=0.6, S(I,C)=0.2, S(I,D)=0.1, S(I,E)=0.2 \quad \text{(formula 16)}$$

While the comparison is performed only with the representative images in the present exemplary embodiment, the similarity to every one of the pieces of data-for-learning used at the time of generating the dictionaries may be calculated and averaged to calculate the similarity to the data-for-learning of each dictionary. A method for learning a specific region extraction dictionary and a method for setting a representative image will be described below.

In the specific region extracting processing performed in S160, the specific region extraction unit 506 selects a dictionary based on the similarity estimated in similar instance selection step S150 or calculates a weighed mean value of recognition results based on the respective dictionaries according to the similarity, as described above. A method for leaning a dictionary and a feature amount at the time of the recognition will be described below, and a recognition target may be a pixel or region of an identification target image (or an identification target region of the identification target image). As to a final specific region, a probability value (real number of 0 to 1) may be output, or a region having a probability equal to or higher than a predefined threshold value may be specified as a specific region.

Next, offline (learning) processing performed in advance in the present exemplary embodiment will be described. FIG. 11B is a schematic block diagram illustrating a functional configuration of a learning device 300 according to the present exemplary embodiment. The learning device 300 according to the present exemplary embodiment includes a similar instance selection unit 304, a specific region extraction dictionary learning unit 305, and the specific region extraction dictionary holding unit 508 in addition to functional units of the learning device according to the first exemplary embodiment. The specific region extraction dictionary holding unit 508 may be configured to be connected as a non-volatile storage device to the image recognition apparatus 20. Further, the learning device 300 may be configured to be a device similar to the image recognition apparatus 20 illustrated in FIG. 4B. Further, at this time, a part detection unit 301, a region setting unit 302, and a feature amount acquisition unit 303 may be shared with a part detection unit 502, a region setting unit 503, and a feature amount acquisition unit 504 of the image recognition apparatus 20. Further, a data-for-learning holding unit 507 is shared during an offline time and an online time. Details of processing to be performed by a functional unit included in the learning device 300 according to the present exemplary embodiment will be described below with reference to FIG. 12B, etc.

FIG. 12B is a flow chart illustrating learning processing to be performed by the learning device 300 according to the present exemplary embodiment. In the flow chart illustrated in FIG. 12B, part detection step T210 to feature amount acquisition step T230 are similar to part detection step T110 to feature amount acquisition step T130 in the first exemplary embodiment.

In similar instance selection step T240, the similar instance selection unit 304 calculates the similarity between learning images based on the feature amounts acquired in feature amount acquisition step T230, and selects a similar instance image. The processing performed by the similar instance selection unit 304 is basically similar to the processing performed in the similar instance selection step T150 in the first exemplary embodiment. A different point is that in order to learn a plurality of dictionaries in a specific region extraction dictionary learning step T250, which is the next step, a plurality of learning images to be used at the time of learning each dictionary is selected based on the similarity. At this time, the same learning image may be selected for the leaning of a plurality of dictionaries. A list of the selected learning images is transmitted to the specific region extraction dictionary learning unit 305.

In specific region extraction dictionary learning step T250, the specific region extraction dictionary learning unit 305 learns a plurality of specific region extraction dictionaries based on the list of learning images selected in similar instance selection step T240. A specific region extraction dictionary is a classifier configured to output the likelihood (score) as to whether a pixel or region is a specific region, in response to the input of a feature amount of the pixel or region, and parameters of the classifier. For example, support vector machines (SVMs) may be learned. A feature amount to be input may be a RGB value or histogram of a pixel or region, a texture feature amount described above in feature amount acquisition step T230. Further, as in the first exemplary embodiment, a difference value of a feature amount from a nearby pixel or small region may be input to the classifier. The learned dictionaries are held in the specific region extraction dictionary holding unit 508 and used at the time of the recognition.

As described above, according to the present exemplary embodiment, the image recognition apparatus 20 performs part detection on an identification target image and extracts an identification target region. The image recognition apparatus 20 sets an inquiry region to the extracted identification target region and selects a similar instance image from data-for-learning based on a feature amount of the inquiry region. Then, based on the selected similar instance image, the image recognition apparatus 20 selects a dictionary for extracting a specific region of the identification target image or determines the weight of a detection result of each dictionary. Selecting a dictionary using a similar instance image in the data-for-learning enables accurate detection of a specific region of an identification target image.

In a third exemplary embodiment of the present invention, instead of detecting the position of each part of an identification target object by use of a part detection unit and the range of the identification target object, a user is prompted to set the position of each part and the range of an identification target object on an identification target displayed on a display apparatus, and results of the setting are acquired. Hereinbelow, the third exemplary embodiment of the present invention will be described. Configurations that are already described above in the first or second exemplary embodiment are given the same reference numerals, and description thereof is omitted.

Figure 13A:
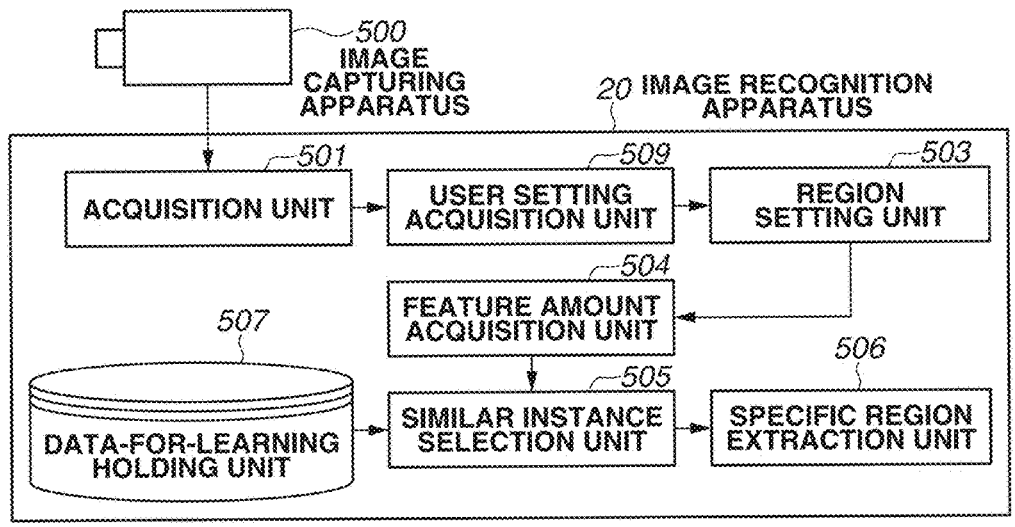
FIGS. 13A and 13B are block diagrams each illustrating a functional configuration of an image recognition apparatus according to an exemplary embodiment.

FIG. 13A is a schematic block diagram illustrating a functional configuration of an image recognition apparatus 20 according to the present exemplary embodiment. Compared to the first exemplary embodiment, a user setting acquisition unit 509 is added in place of the part detection unit 502. The configuration of a learning device is similar to that in the first exemplary embodiment.

FIG. 5B is a flow chart illustrating details of image recognition processing to be performed by the image recognition apparatus 20 according to the present exemplary embodiment. In FIG. 5B, acquisition step S310 is similar to acquisition step S110 in the first exemplary embodiment.

Figure 14:
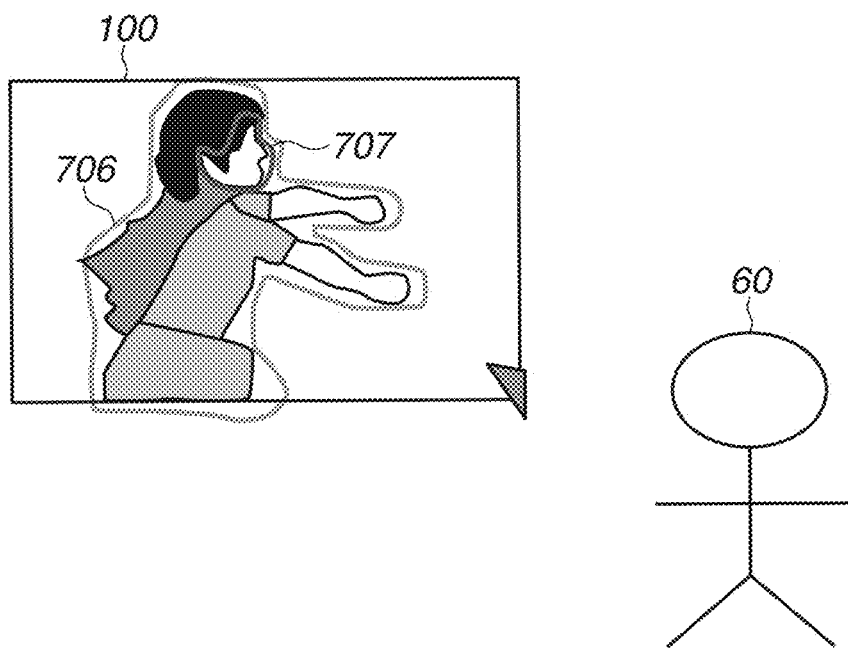
FIG. 14 illustrates how a user sets an object region according to a third exemplary embodiment.

Next, in part detection step S320, the user setting acquisition unit 509 displays an identification target image 100 on a display unit 406 to prompt a user to set a part region or an object region in the identification target image 100. FIG. 14 illustrates how a user sets an identification target region and a face region. A user 60 sets an identification target region 706 and a face region 707 in the identification target image 100 by use of an operation unit 405 (e.g., mouse). Then, the user setting acquisition unit 509 acquires information (position, size, etc.) about the identification target region 706 and the face region 707 set by the user 60. While the regions are set using free-form curves in FIG. 14, a region may be set in the form of a rectangular region. Further, a specific means of the operation unit 405 is not limited to a mouse.

Inquiry region setting step S330 to a specific region extraction step S360 are similar to the inquiry region setting step S130 to the specific region extraction step S160 in the first exemplary embodiment.

While it is described that the basic configuration according to the present exemplary embodiment is similar to that according to the first exemplary embodiment, the part detection unit 502 of the image recognition apparatus 20 according to the second exemplary embodiment may be changed to the user setting acquisition unit 509. Further, while it is described that the configuration of the learning device according to the present exemplary embodiment is similar to that according to the first exemplary embodiment, the user setting acquisition unit 509 may be used at the time of the learning in place of the part detection unit 301, or the part detection unit 301 and the user setting acquisition unit 509 may be used in combination.

As described above, according to the present exemplary embodiment, the image recognition apparatus 20 acquires a result of the setting of an identification target region or part position with respect to an identification target image by a user. An inquiry region is set to the acquired identification target region or part position as a setting result, and a similar instance image is selected from the data-for-learning based on a feature amount of the inquiry region. Then, a specific region of an identification target image is extracted based on the selected similar instance image. Use of a similar instance image in the data-for-learning enables accurate detection of a specific region of an identification target image.

According to a fourth exemplary embodiment of the present invention, a similar instance image is selected again based on a feature amount of a specific region specified by a specific region extraction unit 506, and a specific region of an identification target object is detected again using the selected similar instance image. Hereinbelow, the fourth exemplary embodiment of the present invention will be described. Configurations that are already described above in the first to third exemplary embodiments are given the same reference numerals, and description thereof is omitted.

Figure 13B:
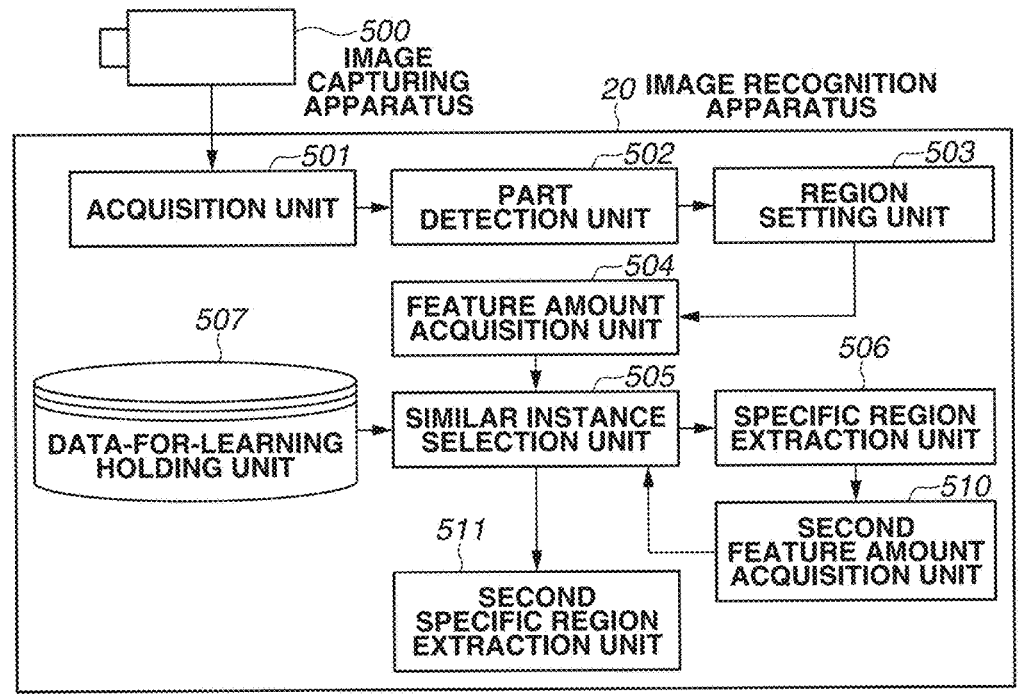

FIG. 13B is a schematic block diagram illustrating a functional configuration of an image recognition apparatus 20 according to the present exemplary embodiment. Compared to the first exemplary embodiment, the image recognition apparatus 20 according to the present exemplary embodiment additionally includes a second feature amount acquisition unit 510 and a second specific region extraction unit 511. The configuration of a learning device is similar to that according to the first exemplary embodiment.

FIG. 5C is a flow chart illustrating details of image recognition processing to be performed by the image recognition apparatus 20 according to the present exemplary embodiment. In FIG. 5C, acquisition step S410 to specific region extraction step S460 are similar to acquisition step S110 to specific region extraction step S160 in the first exemplary embodiment, so that description of acquisition step S410 to specific region extraction step S460 is omitted.

Next, in second feature amount acquisition step S470, the second feature amount acquisition unit 510 acquires a feature amount of a specific region of an identification target image that is extracted in specific region extraction step S460. Alternatively, the second feature amount acquisition unit 510 may set a region including a specific region and then acquires a feature amount within the set region. At this time, as in inquiry region setting step S430, the second feature amount acquisition unit 510 set an inquiry region and then acquire a feature amount.

Next, in second similar instance selection step S480, a similar instance selection unit 505 selects a similar instance image again from a data-for-learning holding unit 507 based on the feature amount acquired in second feature amount acquisition step S470. A selection method used in second similar instance selection step S480 is similar to details of processing performed in similar instance selection step S450, so description of the selection method is omitted.

Next, in second specific region extraction step S490, the second specific region extraction unit 511 extracts the specific region in the identification target image by use of the similar instance image selected in second similar instance selection step S480. At this time, the second specific region extraction unit 511 may also use a similar instance image selected in similar instance selection step S450. A specific region extraction method is similar to that performed in specific region extraction step S460 described in the first exemplary embodiment, so that description of the specific region extraction method is omitted.

While it is described that the basic configuration of the image recognition apparatus 20 according to the present exemplary embodiment is similar to that according to the first exemplary embodiment, the second feature amount acquisition unit 510 and the second specific region extraction unit 511 may be added to the image recognition apparatus 20 according to the second exemplary embodiment. In this case, as to the learning processing, a dictionary at the time of the specific region extraction is learned in advance, but a dictionary to be used in the second specific region extraction unit 511 may be generated by selecting a similar instance image at the time of the recognition and generating the dictionary based on the similar instance image.

As described above, according to the present exemplary embodiment, the image recognition apparatus 20 selects a similar instance image again from the data-for-learning based on a feature amount of a specific region that is detected from an identification target image. Then, the image recognition apparatus 20 specifies a specific region again using the similar instance image in the data-for-learning, whereby the specific region of the identification target image can be detected accurately.

Other Exemplary Embodiments

While the examples in which a skin region in a person region is detected as a specific region of an identification target object are described in the above-described exemplary embodiments, a specific region of an identification target object according to the present invention is not limited to a skin region of a person region. For example, an identification target object may be any identification target object including a plurality of parts or partial regions, and a horse or a car illustrated in FIG. 15A or 15B may be an identification target object and a horse region or a car body region may be extracted as a specific region. As to a parts detector for detecting part detection results 708 in FIGS. 15A and 15B, deformable parts models discussed in "P. Felzenswalb, "Object Detection with Discriminatively Trained Part Based Models", IEEE Conference on Computer Vision and Pattern Analysis and Machine Intelligence, 2010." described above may be used. Alternatively, poselets discussed in "L. Bourdev, "Detecting People Using Mutually Consistent Poselet Activations", European Conference on Computer Vision, 2010." may be used.

The configurations described above according to the exemplary embodiments of the present invention enable accurate identification of a specific region of an identification target from an identification target image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155462, filed Aug. 5, 2015, which is hereby incorporated by reference herein in its entirety.

What is claimed is:

1. An image recognition method, the image recognition method comprising:
   detecting at least one part of an identification target from an identification target image;
   setting an inquiry region based on the detected at least one part of the identification target from an identification target image;
   acquiring a first feature amount of the set inquiry region;
   selecting at least one first instance image corresponding to the identification target image from learning images based on the acquired first feature amount of the set inquiry region;
   extracting a specific region of the identification target from the identification target image as a first extracted specific region based on the selected at least one first instance image;
   acquiring a second feature amount of the first extracted specific region;
   selecting at least one second instance image corresponding to the identification target image from the learning images based on the acquired second feature amount of the first extracted specific region;
   generating a detector based on (i) the at least one first instance image selected based on the acquired first feature amount of the set inquiry region, and (ii) the at least one second instance image selected based on the acquired second feature amount of the first extracted specific region; and
   extracting a specific region from the identification target image as a second extracted specific region using the generated detector,
   wherein the identification target is a person, and the first extracted specific region is a first skin region of the person and the second extracted specific region is a second skin region of the person.

2. The image recognition method according to claim 1, further comprising generating a dictionary based on the selected at least one first instance image,
   wherein the second extracted specific region is extracted based on the generated dictionary.

3. The image recognition method according to claim 1, wherein setting includes setting the inquiry region within a range where the identification target exists.

4. The image recognition method according to claim 1, wherein setting includes setting the inquiry region based on a combination of more than one detected at least one part of the identification target from the identification target image.

5. The image recognition method according to claim 1, further comprising acquiring a user setting result, wherein detecting includes detecting the at least one part of the identification target from the identification target image based on the user setting result.

6. The image recognition method according to claim 1, further comprising using the second extracted specific region for post processing.

7. The image recognition method according to claim 1, further comprising identifying the second skin region of the person by use of the at least one second instance image.

8. An image recognition method, the image recognition method comprising:
    detecting at least one part of an identification target from an identification target image;
    setting an inquiry region based on the detected at least one part of the identification target from the identification target image;
    acquiring a first feature amount of the set inquiry region;
    generating at least one first dictionary based on the acquired first feature amount of the set inquiry region;
    extracting a specific region of the identification target from the identification target image as a first extracted specific region based on (i) the acquired first feature amount of the set inquiry region and (ii) the at least one first dictionary generated based on the acquired first feature amount of the set inquiry region;
    acquiring a second feature amount of the first extracted specific region;
    generating at least one second dictionary based on the acquired second feature amount of the first extracted specific region;
    generating a detector based on (i) the at least one first dictionary generated based on the acquired first feature amount of the set inquiry region, and (ii) the at least one second dictionary generated based on the acquired second feature amount of the first extracted specific region; and
    extracting a specific region from the identification target image as a second extracted specific region using the generated detector,
    wherein the identification target is a person, and the first extracted specific region is a first skin region of the person and the second extracted specific region is a second skin region of the person.

9. The image recognition method according to claim 8, wherein a plurality of dictionaries is weighed based on the acquired first feature amount, and generating the at least one first dictionary based on the acquired first feature amount includes selecting the weighed plurality of dictionaries.

10. An image recognition apparatus comprising:
    one or more processors; and
    memory storing instructions that, when executed by the one or more processors, causes the image recognition apparatus to perform operations including:
    detecting at least one part of an identification target from an identification target image,
    setting an inquiry region based on the detected at least one part of the identification target from the identification target image,
    acquiring a first feature amount of the set inquiry region,
    selecting at least one first instance image corresponding to the identification target image from learning images based on the acquired first feature amount of the set inquiry region,
    extracting a specific region of the identification target from the identification target image as a first extracted specific region based on the selected at least one first instance image,
    acquiring a second feature amount of the first extracted specific region,
    selecting at least one second instance image corresponding to the identification target image from the learning images based on the acquired second feature amount of the first extracted specific region,
    generating a detector based on (i) the at least one first instance image selected based on the acquired first feature amount of the set inquiry region, and (ii) the at least one second instance image selected based on the acquired second feature amount of the first extracted specific region, and
    extracting a specific region from the identification target image as a second extracted specific region using the generated detector,
    wherein the identification target is a person, and the first extracted specific region is a first skin region of the person and the second extracted specific region is a second skin region of the person.

11. An image recognition apparatus comprising:
    one or more processors; and
    memory storing instructions that, when executed by the one or more processors, causes the image recognition apparatus to perform operations including:
    detecting at least one part of an identification target from an identification target image,
    setting an inquiry region based on the detected at least one part of the identification target from the identification target image,
    acquiring a first feature amount of the set inquiry region,
    generating at least one first dictionary based on the acquired first feature amount of the set inquiry region,
    extracting a specific region of the identification target from the identification target image as a first extracted specific region based on (i) the acquired first feature amount of the set inquiry region and (ii) the at least one first dictionary generated based on the acquired first feature amount of the set inquiry region,
    acquiring a second feature amount of the first extracted specific region,
    generating at least one second dictionary based on the acquired second feature amount of the first extracted specific region,
    generating a detector based on (i) the at least one first dictionary generated based on the acquired first feature amount of the set inquiry region, and (ii) the at least one second dictionary generated based on the acquired second feature amount of the first extracted specific region, and
    extracting a specific region from the identification target image as a second extracted specific region using the generated detector,
    wherein the identification target is a person, and the first extracted specific region is a first skin region of the person and the second extracted specific region is a second skin region of the person.

12. A non-transitory computer-readable recording medium storing a program to cause a computer to perform an image recognition steps, the image recognition steps comprising:
    detecting at least one part of an identification target from an identification target image;
    setting an inquiry region based on the detected at least one part of the identification target from the identification target image;
    acquiring a first feature amount of the set inquiry region;
    selecting at least one first instance image corresponding to the identification target image from learning images based on the acquired first feature amount of the set inquiry region;

extracting a specific region of the identification target from the identification target image as a first extracted specific region based on the selected at least one first instance image;

acquiring a second feature amount of the first extracted specific region;

selecting at least one second instance image corresponding to the identification target image from the learning images based on the acquired second feature amount of the first extracted specific region, generating a detector based on (i) the at least one first instance image selected based on the acquired first feature amount of the set inquiry region, and (ii) the at least one second instance image selected based on the acquired second feature amount of the first extracted specific region;

and extracting a specific region from the identification target image as a second extracted specific region using the generated detector, wherein the identification target is a person, and the first extracted specific region is a first skin region of the person and the second extracted specific region is a second skin region of the person.

13. A non-transitory computer-readable recording medium storing a program to cause a computer to perform an image recognition steps, the image recognition steps comprising:

detecting at least one part of an identification target from an identification target image;

setting an inquiry region based on the detected at least one part of the identification target from the identification target image;

acquiring a first feature amount of the set inquiry region;

generating at least one first dictionary based on the acquired first feature amount of the set inquiry region;

extracting a specific region of the identification target from the identification target image as a first extracted specific region based on (i) the acquired first feature amount of the set inquiry region and (ii) the at least one first dictionary generated based on the acquired first feature amount of the set inquiry region;

acquiring a second feature amount of the first extracted specific region;

generating at least one second dictionary based on the acquired second feature amount of the first extracted specific region;

generating a detector based on (i) the at least one first dictionary generated based on the acquired first feature amount of the set inquiry region, and (ii) the at least one second dictionary generated based on the acquired second feature amount of the first extracted specific region;

and extracting a specific region from the identification target image as a second extracted specific region using the generated detector, wherein the identification target is a person, and the first extracted specific region is a first skin region of the person and the second extracted specific region is a second skin region of the person.

* * * * *